United States Patent
Oshika et al.

(10) Patent No.: US 7,605,968 B2
(45) Date of Patent: Oct. 20, 2009

(54) DISPLAY MEDIUM

(75) Inventors: Yumiko Oshika, Ichinomiya (JP); Yoshito Toyoda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 231 days.

(21) Appl. No.: 11/844,918

(22) Filed: Aug. 24, 2007

(65) Prior Publication Data

US 2008/0062627 A1 Mar. 13, 2008

Related U.S. Application Data

(63) Continuation-in-part of application No. PCT/JP2006/303865, filed on Mar. 1, 2006.

(30) Foreign Application Priority Data

Mar. 2, 2005 (JP) ............... 2005-057655
Mar. 2, 2005 (JP) ............... 2005-057656

(51) Int. Cl.
G02F 1/03 (2006.01)
G02F 1/07 (2006.01)
G02B 26/00 (2006.01)
(52) U.S. Cl. .................. 359/253; 359/296
(58) Field of Classification Search .......... 359/242, 359/247, 246, 253, 252, 267, 281, 290, 291, 359/296, 298

See application file for complete search history.

(56) References Cited

U.S. PATENT DOCUMENTS 5,944,934 A 8/1999 Park

FOREIGN PATENT DOCUMENTS

| JP | S59-131914 A | 7/1984 |
| JP | H07-072807 A | 3/1995 |
| JP | H08-036476 A | 2/1996 |
| JP | H08-138615 A | 5/1996 |
| JP | H08-248429 A | 9/1996 |
| JP | H11-249155 A | 9/1999 |
| JP | 11-287978 | * 10/1999 |
| JP | H11-337958 A | 12/1999 |
| JP | 2004-117523 A | 4/2004 |

* cited by examiner

*Primary Examiner*—Ricky L Mack
*Assistant Examiner*—Brandi N Thomas
(74) *Attorney, Agent, or Firm*—Baker Botts L.L.P.

(57) ABSTRACT

A display medium includes a pair of substrates, a spacer, an injection port, and an exhaust port. The pair of substrates faces to be in parallel with each other. At least one of the pair of substrates constitutes a display surface. The spacer is disposed between the pair of substrates to form a fluid chamber together with the pair of substrates. The fluid chamber encapsulates a fluid material and has a polygonal shape in a cross section taken parallel to the display surface. The polygonal shape has two acute corners each having an angle greater than 0° and no greater than 75°. The fluid material flows in accordance with electric fields generated between the pair of substrates to display images on the display surface. The fluid material is injected into the fluid chamber through the injection port. Air in the fluid chamber is exhausted outside the fluid chamber through the exhaust port. A distance between one of the injection port and the exhaust port and one of the two acute corners as viewed from a direction orthogonal to the substrate is equal to or smaller than 5 mm.

17 Claims, 13 Drawing Sheets

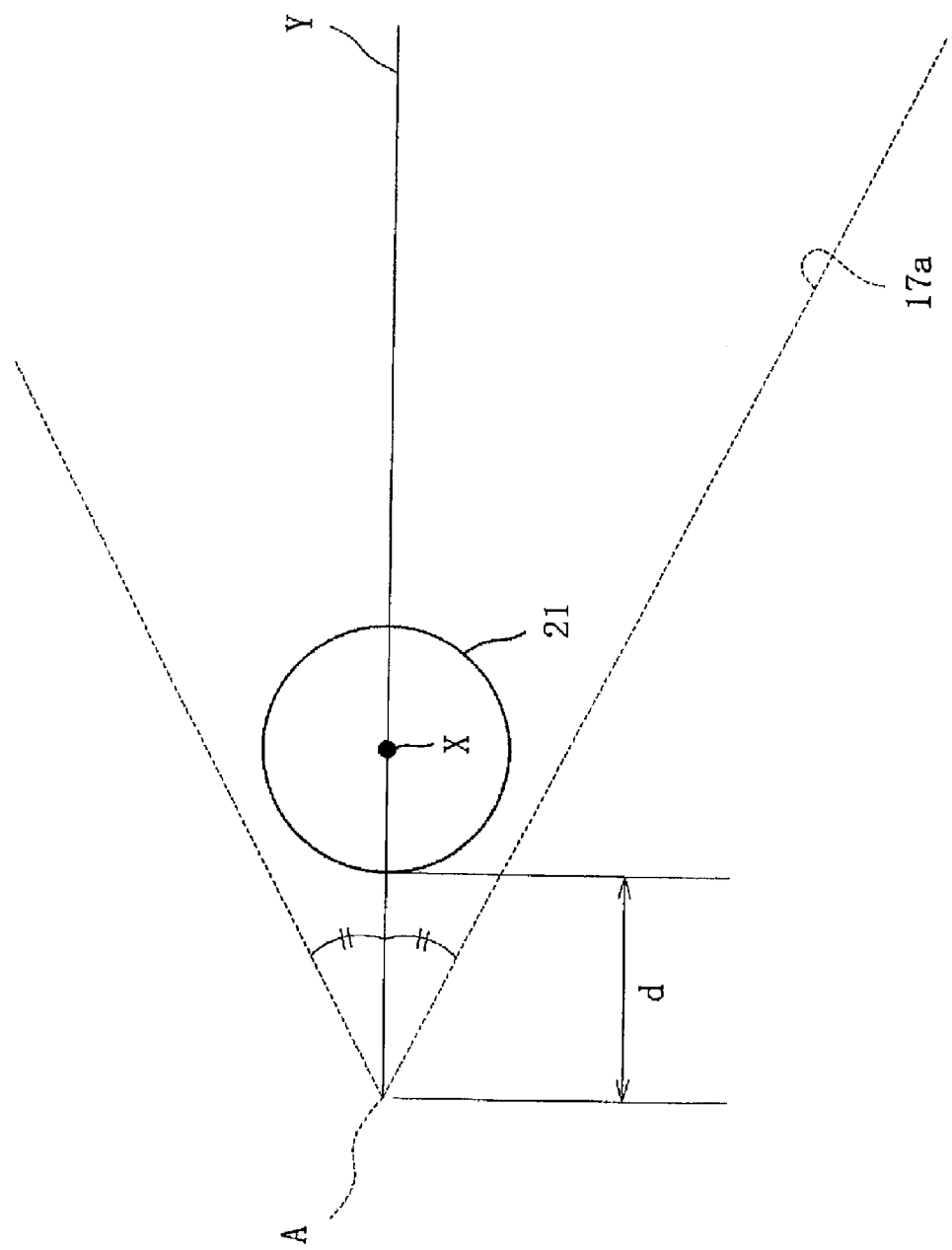

FIG. 3

| ANGLE FOR CONER A | ANGLE FOR CONER B | EVALUATION |
|---|---|---|
| 30° | 30° | ○ |
| | 60° | ○ |
| | 75° | ○ |
| | 90° | △ |
| | 120° | × |
| 60° | 30° | ○ |
| | 60° | ○ |
| | 75° | ○ |
| | 90° | △ |
| | 120° | × |
| 75° | 30° | ○ |
| | 60° | ○ |
| | 75° | ○ |
| | 90° | △ |
| | 120° | × |
| 90° | 75° | △ |
| | 90° | △ |
| | 120° | × |
| 120° | 30° | × |

FIG. 4

| d /mm | d' /mm | EVALUATION |
|---|---|---|
| 1 | 1 | ○ |
|   | 3 | ○ |
|   | 5 | △ |
|   | 7 | × |
| 3 | 1 | ○ |
|   | 3 | ○ |
|   | 5 | △ |
|   | 7 | × |
| 5 | 1 | ○ |
|   | 3 | ○ |
|   | 5 | △ |
|   | 7 | × |
| 7 | 3 | × |

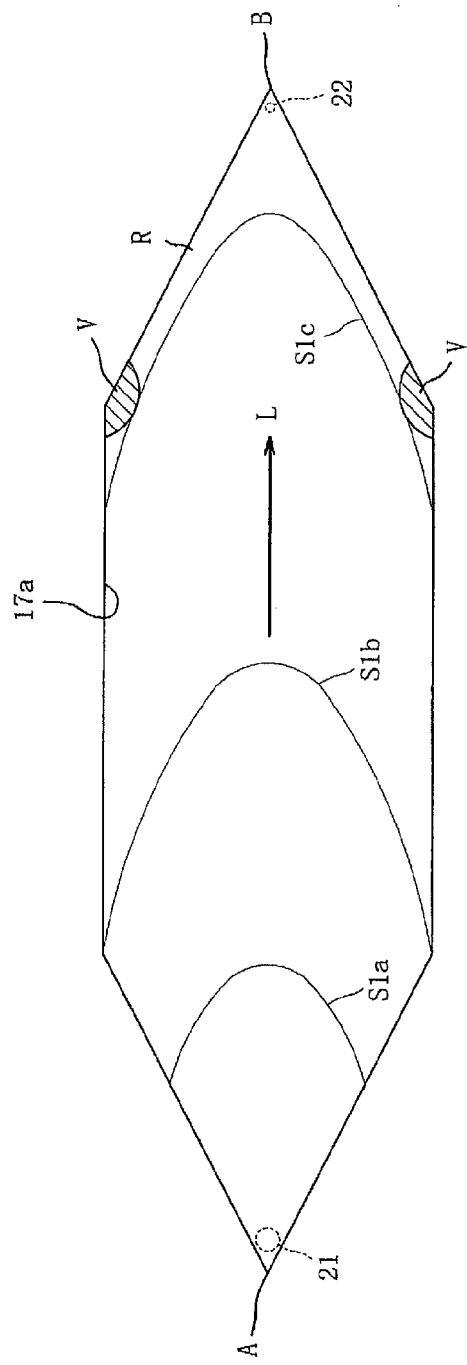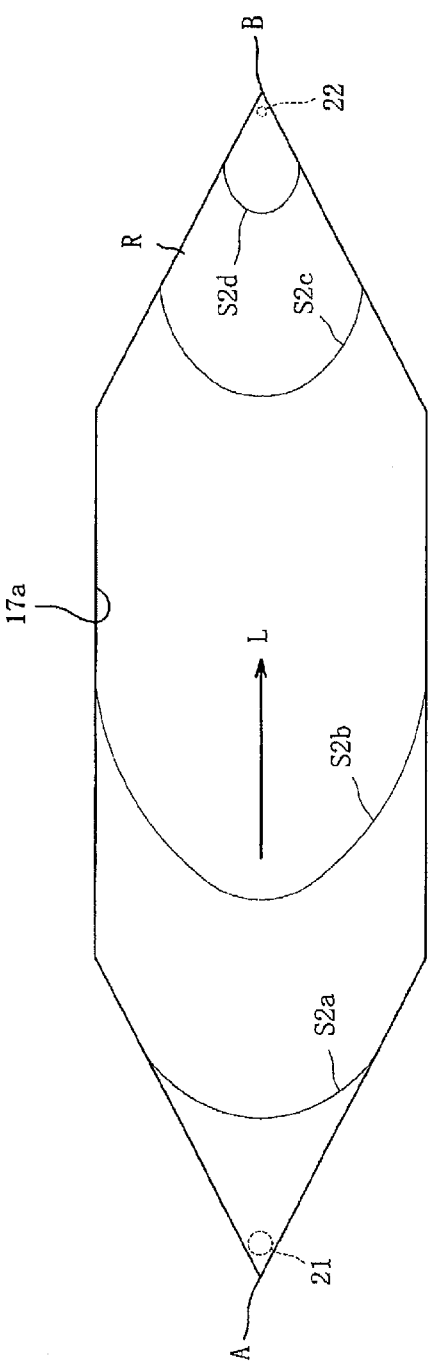

FIG. 7

| $d_{1min}/\mu m$ \ $C/wt\%$ | 0.1 | 1 | 5 | 10 | 20 | 50 |
|---|---|---|---|---|---|---|
| 10 | × | × | × | × | × | × |
| 20 | △ | △ | △ | △ | × | × |
| 25 | ○ | ○ | ○ | ○ | △ | △ |
| 30 | ○ | ○ | ○ | ○ | ○ | ○ |
| 50 | ○ | ○ | ○ | ○ | ○ | ○ |
| 100 | ○ | ○ | ○ | ○ | ○ | ○ |
| 1000 | ○ | ○ | ○ | ○ | ○ | ○ |
| 5000 | ○ | ○ | ○ | ○ | ○ | ○ |

FIG. 9

| RESULT<br>$d_{2min}/\mu m$ | INJECTION | INCREASE IN AIR BUBBLE |
|---|---|---|
| 5 | IMPOSSIBLE | NOT EXPERIMENT |
| 10 | GOOD | NOT INCREASE |
| 15 | GOOD | NOT INCREASE |
| 20 | GOOD | INCREASE |
| 25 | GOOD | INCREASE |

DISPLAY MEDIUM

CROSS-REFERENCE TO RELATED APPLICATION

This application is a Continuation-In-Part of International Application No. PCT/JP2006/303865 filed Mar. 1, 2006, which claims the benefits of Japanese Patent Application No. 2005-057655 field Mar. 2, 2005; and Japanese Patent Application No. 2005-057656 field Mar. 2, 2005. The entire content of each of the prior applications is incorporated herein by reference in its entirety.

BACKGROUND OF THE INVENTION

1. Field of the Invention

The present invention relates to a display medium capable of displaying an image by applying an electric field to fluid material sealed in a fluid chamber.

2. Description of the Related Art

In a display medium, such as a liquid crystal display device or an electrophoretic display device having a fluid chamber formed between two opposing substrates, image quality suffers when air bubbles enter the fluid material, such as the liquid crystal or electrophoretic medium, sealed in the fluid chamber. Various technologies have been proposed for preventing air bubbles from getting into the fluid material.

For example, a liquid crystal display cell is proposed in Japanese unexamined patent application publication No. 2004-117523. The liquid crystal display cell is formed with no residual air bubbles and no unfilled areas by providing a plurality of injection ports for injecting a liquid crystal material, and by providing exhaust ports in regions where the liquid crystal material injected through the injection ports is slow to arrive.

Japanese unexamined patent application publication No. HEI-11-249155 proposes a method for producing a fluid material injected structure, such as a liquid crystal device. The method includes arranging a pair of substrates in confrontation with each other, after applying a liquid crystal or other fluid material to one of the substrates, holding the substrates at a prescribed distance from each other using noncontact holding means, and subsequently releasing the held state of the substrates so that the pair of substrates is gradually pressed together from one edge to the opposing edge, flattening the fluid material in the sealed region.

However, with the technology disclosed in Japanese unexamined patent application publication No. 2004-117523, there have been difficulties in reliably predicting the flow of injected liquid crystal material in order to provide the exhaust ports in the appropriate locations. Hence, after providing exhaust ports at locations based on the predicted flow of liquid crystal material, the liquid crystal material did not always flow as predicted due to the conditions at the time of injection, resulting in air bubbles produced in the liquid crystal material.

Further, since the liquid crystal display cell according to this technology is provided with a plurality of openings, i.e. the injection ports and the exhaust ports, the risk of air bubbles entering the cell during or after sealing these openings is high.

On the other hand, the method of bonding the two substrates via a fluid material disclosed in Japanese unexamined patent application publication No. HEI-11-249155 is effective when the fluid material injected structure (hereinafter referred to as a "display medium") is a liquid crystal cell for a liquid crystal display device since the fluid material is a liquid crystal containing no particles. However, when the display medium being produced is a display panel for an electrophoretic device, the fluid material is a charged particle dispersion fluid containing charged particles. Hence, bonded areas of the substrates became contaminated by charged particles, compromising the bonds between the substrates and allowing air bubbles to enter after the substrates have been sealed.

SUMMARY OF THE INVENTION

In view of the foregoing, it is an object of the present invention to provide a display medium for use in an electrophoretic device or a liquid crystal display device, for example, having a structure for injecting a fluid material into a fluid chamber while reliably preventing air bubbles from entering the chamber.

In order to attain the above and other objects, the present invention provides a display medium including a pair of substrates, a spacer, an injection port, and an exhaust port. The pair of substrates faces to be in parallel with each other. At least one of the pair of substrates constitutes a display surface. The spacer is disposed between the pair of substrates to form a fluid chamber together with the pair of substrates. The fluid chamber encapsulates a fluid material and has a polygonal shape in a cross section taken parallel to the display surface. The polygonal shape has two acute corners each having an angle greater than 0° and no greater than 75°. The fluid material flows in accordance with electric fields generated between the pair of substrates to display images on the display surface. The fluid material is injected into the fluid chamber through the injection port. Air in the fluid chamber is exhausted outside the fluid chamber through the exhaust port. A distance between one of the injection port and the exhaust port and one of the two acute corners as viewed from a direction orthogonal to the substrate is equal to or smaller than 5 mm.

BRIEF DESCRIPTION OF THE DRAWINGS

The particular features and advantages of the invention as well as other objects will become apparent from the following description taken in connection with the accompanying drawings, in which:

FIG. 2 is an enlarged view of a corner A shown in FIG. 1A;

FIG. 3 is a table showing the results of studying whether air bubbles enter a charged particle-dispersed liquid based on varied angles for corners A and B;

FIG. 4 is a table showing the results of studying whether air bubbles enter the charged particle-dispersed liquid for varying distances d and d';

FIG. 5 is an explanatory diagram conceptually illustrating the shape of the interface of the charged particle-dispersed liquid relative to the direction of flow when the liquid is injected through the injection port;

FIG. 7 is a table showing the results of an experiment on the diameter of the injection port;

FIG. 9 is a table showing the results of an experiment on the diameter of an exhaust port;

DETAILED DESCRIPTION OF THE PREFERRED EMBODIMENTS

Next, a preferred embodiment of the present invention will be described while referring to the accompanying drawings. The terms "upward", "downward", "upper", "lower", "above", "below", "beneath" and the like will be used throughout the description assuming that the ink jet printer is disposed in an orientation in which it is intended to be used.

Figure 1A:
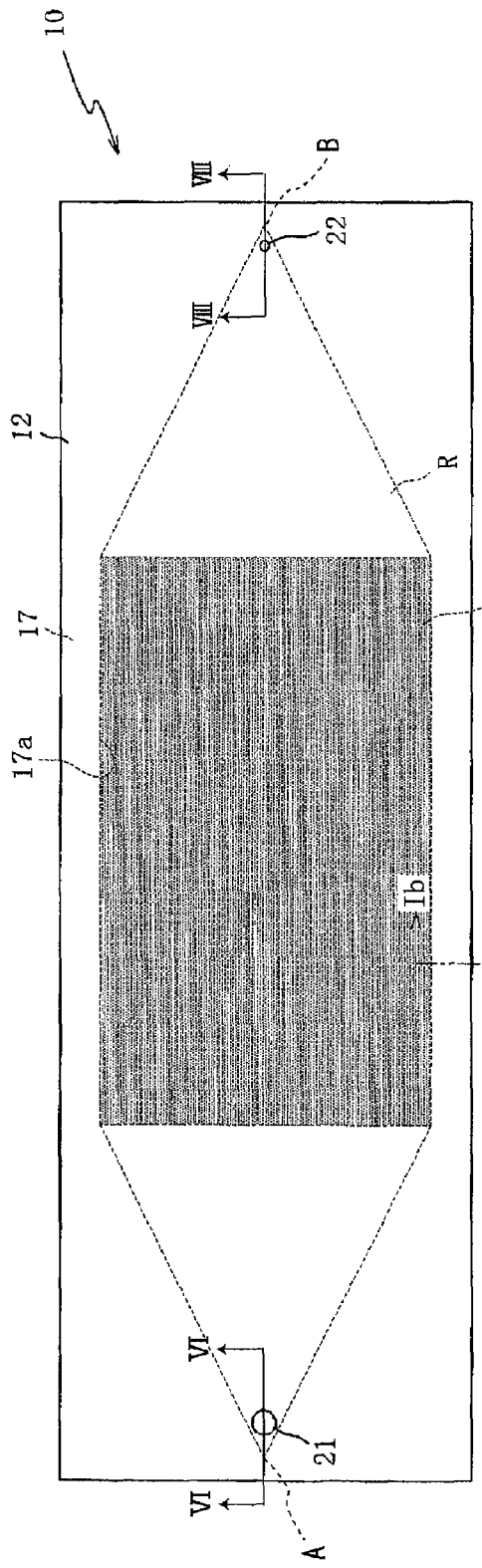
FIG. 1A is a plan view of an image display medium according to a preferred embodiment of the present invention.
Figure 1B:
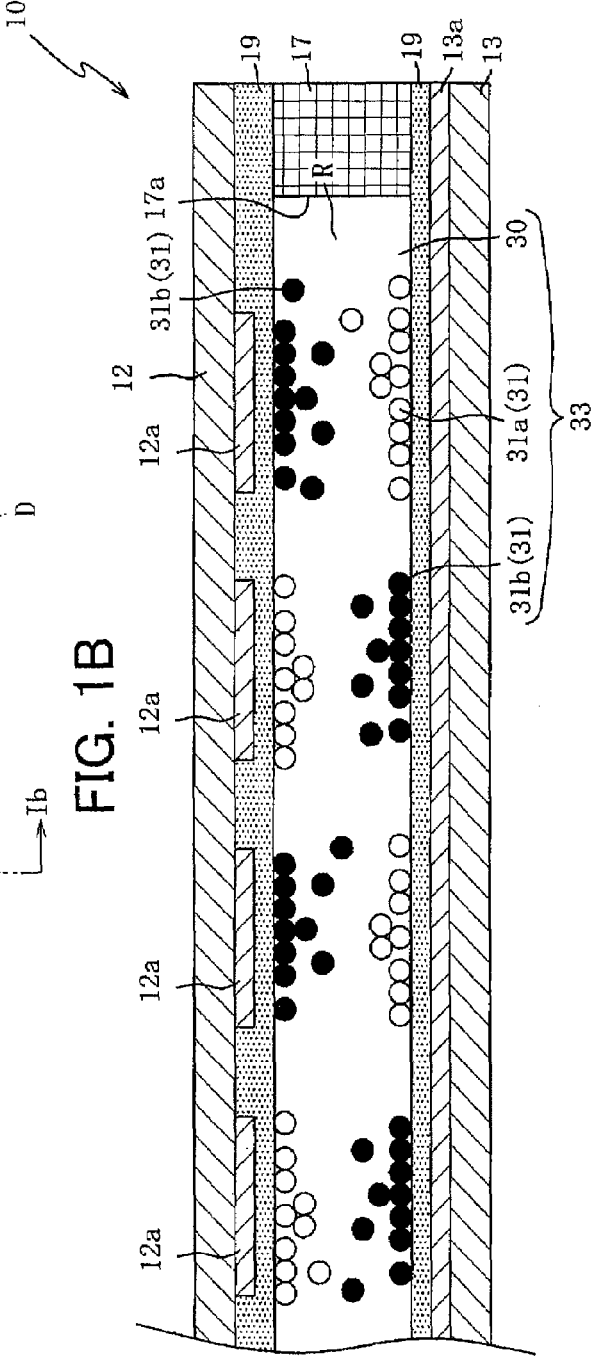
FIG. 1B is an explanatory diagram conceptually illustrating a cross section of the image display medium along the line 1b-1b shown in FIG. 1A.

FIG. 1A is a plan view of an image display medium according to a preferred embodiment of the present invention. FIG. 1B is an explanatory diagram conceptually illustrating a cross section of the image display medium along the line Ib-Ib shown in FIG. 1A. FIG. 2 is an enlarged view of a corner A shown in FIG. 1A. First, the overall structure of an image display medium 10 will be described with reference to FIGS. 1A to 2.

The display medium 10 is a panel for an electrophoretic display and has a substantially rectangular shape in a plan view, as shown in FIG. 1A. The display medium 10 is connected to a drive control unit (not shown) for controlling electric signals (electric current, voltage, and polarity) applied to X electrodes 12a and Y electrodes 13a and displays an image based on user operations in a display region D of a first substrate 12, which serves as the display surface.

As shown in FIG. 1B, the display medium 10 is primarily configured of the first substrate 12, a second substrate 13, and a gap spacer 17 interposed between the first substrate 12 and second substrate 13.

Both the first and second substrates 12 and 13 are plate-shaped members having a thickness of approximately 700 μm and formed of glass or a synthetic resin such as polyethylene terephthalate (PET), a natural resin, paper, or the like. The X electrodes 12a and Y electrodes 13a are provided on opposing surfaces of the first substrate 12 and second substrate 13, respectively, in a region corresponding to the display region D.

The X electrodes 12a and Y electrodes 13a carry a polarity for applying an electric field to a particle-dispersed liquid 33 accommodated in a fluid chamber R. The X electrodes 12a and the Y electrodes 13a both include a plurality of essentially parallel lines, which are substantially orthogonal in relation to each other when viewed from the surface of the display medium 10 shown in FIG. 1A. Hence, the display medium 10 employs a simple matrix drive system for switching the X electrodes 12a and Y electrodes 13a on and off.

The X electrodes 12a and Y electrodes 13a are formed of an electrically conductive material, such as a metal, semiconductor, conductive resin, conductive coating, and conductive ink, or transparent inorganic conductors, but are not particularly limited to these materials. The X electrodes 12a and Y electrodes 13a are formed of the above materials on the first substrate 12 and second substrate 13, respectively, according to one of various methods well known in the art, such as electroless plating, sputtering, vapor deposition, or an inkjet method.

Protective films 19 having a resistance to fluids are provided on the surfaces of the X electrodes 12a and Y electrodes 13a formed on the first substrate 12 and second substrate 13, respectively. The protective films 19 prevent direct contact between a liquid electrophoretic medium 30 and the X electrodes 12a and Y electrodes 13a, thereby preventing deterioration of the X electrodes 12a and Y electrodes 13a in the display medium 10. The protective films 19 are preferably a film having a fluorine-containing compound for its excellent water repellency, oil repellency, corrosion resistance, and chemical resistance, for example.

The fluorine-containing compound should be a type that has a liquid form above a prescribed temperature, such as low-molecular-weight polytetrafluoroethylene (low-molecular-weight PTFE), low-molecular-weight polychlorotrifluoroethylene (low-molecular-weight PCTFE), low-molecular-weight tetrafluoroethylene-perfluoroalkyl vinyl ether copolymer (low-molecular-weight PFA), and low-molecular-weight tetrafluoroethylene-hexafluoropropylene copolymer (low-molecular-weight FEP).

The gap spacer 17 is a plate-shaped member having a thickness of about 25 μm and is formed of a synthetic resin, such as PET, a natural resin, a ceramic, glass, or the like. In the plan view shown in FIG. 1A, the gap spacer 17 has a hexagonal opening 17a with opposing corners A and B formed as acute angles.

The fluid chamber R is formed between the first and second substrates 12 and 13, which are separated by the gap spacer 17. The shape of the fluid chamber R is defined by the shape of the hexagonal opening 17a and the thickness of the gap spacer 17. Hence, in the preferred embodiment, the fluid chamber R has a hexagonal shape in a plan view with the two corners A and B formed at acute angles based on the shape of the hexagonal opening 17a and has a thickness of 25 μm.

The fluid chamber R is filled with the particle-dispersed liquid 33 configured of charged particles 31 dispersed in the electrophoretic medium 30. The electrophoretic medium 30 in the fluid chamber R serves as a dispersion medium for the particle-dispersed liquid 33 is preferably a solvent having a large electrical resistance (high insulating property). Examples of preferable solvents include an aromatic hydrocarbon solvent (for example, benzene, toluene, and xylene), an aliphatic hydrocarbon solvent (for example, a normal or cyclic paraffinic hydrocarbon solvent such as hexane or cyclohexane, an isoparaffinic hydrocarbon solvent, or kerosene), a halogenated hydrocarbon solvent (for example, chloroform, trichloroethylene, dichloromethane, trichlorotrifluoroethylene, or ethyl bromide), an oily polysiloxane such as silicone oil, or a high-purity oil. The display medium 10 may use any one of or a mixture of two or more of the solvents mentioned above.

The charged particles 31, which are the dispersoid in the particle-dispersed liquid 33, include white charged particles 31a that are positively charged, and black charged particles 31b that are negatively charged. The white charged particles 31a and black charged particles 31b may be formed of an organic pigment, such as a white titanium oxide and a black carbon black or a phthalocyanine pigment, the surface of which is coated with a fluorine monomolecular film or treated with a silane coupling agent to give the particles a hydrophobic property.

For each pixel in the display medium 10, the white charged particles 31a and black charged particles 31b migrate to either the first substrate 12 side or the second substrate 13 side according to the electric field generated between the X electrodes 12a and Y electrodes 13a.

Specifically, when an electric field is formed such that the potential of the X electrodes 12a is positive relative to the potential of the Y electrodes 13a, then the negatively charged black charged particles 31b migrate toward the first substrate 12 side (X electrodes 12a side), while the positively charged white charged particles 31a migrate toward the second substrate 13 side (the Y electrode 13a side).

However, when an electric field is formed such that the potential of the X electrodes 12a is negative relative to the potential of the Y electrodes 13a, then the positively charged white charged particles 31a migrate toward the first substrate 12 side (X electrodes 12a side, while the negatively charged black charged particles 31b migrate toward the second substrate 13 side (Y electrodes 13a side). Using a control unit (not shown) to apply an electric field between the X electrodes 12a and Y electrodes 13a based on image data, a black image is displayed in the display region D of the first substrate 12, which is the display surface, due to the black charged particles 31b migrating to the first substrate 12 side based on the image data.

An injection port 21 and an exhaust port 22 are provided in the first substrate 12 of the display medium 10. The injection port 21 is a through-hole for injecting the particle-dispersed liquid 33 into the fluid chamber R, and the exhaust port 22 is a through-hole for allowing air in the fluid chamber R to escape when the particle-dispersed liquid 33 is injected into the fluid chamber R through the injection port 21. The shapes of the injection port 21 and exhaust port 22 will be described in detail later.

The number of the injection ports 21 and the exhaust ports 22 may be the same or different, provided that at least one of each is provided. However, the larger number of the injection ports 21 and exhaust ports 22, the greater the risk of air bubbles entering the fluid chamber R when or after the ports are sealed. Accordingly, it is preferable to provide one each of the injection ports 21 and exhaust ports 22.

After assembling cells of the display medium 10 having the above construction (the display medium 10 having the fluid chamber R), an ambient pressure technique, for example, is used for injecting the particle-dispersed liquid 33 into the fluid chamber R. Specifically, the injection port 21 of an empty cell is immersed in the particle-dispersed liquid 33 under normal pressure, for example, and capillary action is used to fill the fluid chamber R with the particle-dispersed liquid 33, while air (gas) present in the fluid chamber R is exhausted out through the exhaust port 22. Once the fluid chamber R is filled with the particle-dispersed liquid 33, the display medium 10 is removed from the particle-dispersed liquid 33 and the injection port 21 and exhaust port 22 are sealed with an epoxy resin or other sealant.

As described above, the fluid chamber R has a hexagonal shape in a plan view with the acute-angled corners A and B, and the injection port 21 and exhaust port 22 are formed near the corners A and B, respectively. As will be described in greater detail below, by positioning the injection port 21 and exhaust port 22 near the respective acute-angled corners A and B in the fluid chamber R, it is possible to control the direction in which the injected particle-dispersed liquid 33 flows to effectively prevent air bubbles from getting mixed in the particle-dispersed liquid 33.

In other words, by forming the injection port 21 near the acute-angled corner A and the exhaust port 22 near the acute-angled corner B on the opposite side from the corner A, the particle-dispersed liquid 33 flows easily into the fluid chamber R along the two-sides forming the corner A and is guided along the two sides forming the corner B toward the exhaust port 22 positioned near the corner B, while reliably exhausting air from the fluid chamber R as the fluid chamber R fills with the particle-dispersed liquid 33. Accordingly, the fluid chamber R can be filled with the particle-dispersed liquid 33 without air bubbles becoming mixed therein.

As will be described later in greater detail, it is preferable to position the injection port 21 and exhaust port 22 in corners having an angle greater than 0° and no greater than 75°. By forming the corners A and B near which the injection port 21 and exhaust port 22 are provided greater than 0° and no greater than 75°, the particle-dispersed liquid 33 can easily be made to flow in a direction from the injection port 21 to the exhaust port 22, which effectively prevents residual air bubbles from becoming trapped in the fluid chamber R and mixed in the particle-dispersed liquid 33 when the particle-dispersed liquid 33 is injected into the fluid chamber R.

It is also preferable to separate the injection port 21 and exhaust port 22 from each other as far as possible so as not to impede the flow of the particle-dispersed liquid 33 injected into the fluid chamber R and to prevent air bubbles from remaining in the fluid chamber R during injection. Hence, the corners A and B near which the injection port 21 and exhaust port 22 are disposed are preferably positioned opposite and not adjacent to one another.

By forming the corners A and B at opposing corners, the particle-dispersed liquid 33 injected into the fluid chamber R is less likely to flow with bias from the injection port 21 to the exhaust port 22 and can fill the fluid chamber R while reliably discharging air bubbles through the exhaust port 22. As a result, this configuration effectively prevents air bubbles from mixing in the particle-dispersed liquid 33 when the particle-dispersed liquid 33 is injected into the fluid chamber R.

When one each of the injection port 21 and exhaust port 22 is provided, as in the preferred embodiment, the injection port 21 and exhaust port 22 are preferably disposed at corners A and B separated farthest away from each other. By disposing the injection port 21 and exhaust port 22 in these corners, it is possible to most effectively direct the flow of the particle-dispersed liquid 33 from the injection port 21 to the exhaust port 22. Accordingly, the particle-dispersed liquid 33 can fill the fluid chamber R while reliably exhausting air from the exhaust port 22. As a result, this construction can effectively prevent air bubbles from entering the particle-dispersed liquid 33 when the particle-dispersed liquid 33 is injected into the fluid chamber R.

While described below in greater detail, the injection port 21 is preferably provided at a position in which the shortest distance d (see FIG. 2) from the injection port 21 to the vertex of the corner A is no greater than 5 mm. By setting the shortest distance d from the injection port 21 to the vertex of the corner A no greater than 5 mm, the flow of the particle-dispersed liquid 33 injected along the two sides constituting the corner A can be easily controlled to inhibit air bubbles from remaining near the vertex of the corner A. As a result, this configuration can effectively prevent air bubbles from mixing into the particle-dispersed liquid 33.

As with the injection port 21, the exhaust port 22 is also preferably disposed at a position in which a shortest distance d' (not shown) to the vertex of the corner B is no greater than 5 mm. By setting the shortest distance d' from the exhaust port 22 to the vertex of the corner B no greater than 5 mm, the particle-dispersed liquid 33 fills the fluid chamber R without allowing air bubbles to remain near the vertex of the corner B, thereby effectively preventing air bubbles from mixing into the particle-dispersed liquid 33.

As shown in FIG. 2, the center X of the injection port 21 is preferably positioned substantially on a bisector Y of the corner A. By positioning the injection port 21 such that the center X is substantially on the bisector Y of the corner A, the flow of the particle-dispersed liquid 33 injected through the injection port 21 can be controlled in a direction from the injection port 21 to the exhaust port 22 without producing residual air bubbles and with little chance of bias in the flow. As a result, this construction effectively prevents air bubbles from mixing into the particle-dispersed liquid 33.

As with the injection port 21, the center of the exhaust port 22 is also preferably positioned on the bisector of the corner B. By positioning the exhaust port 22 in this way, the particle-dispersed liquid 33 is more likely to flow to the exhaust port 22 without bias and can reliably exhaust air bubbles from the exhaust port 22, thereby effectively preventing air bubbles from mixing with the particle-dispersed liquid 33.

The inventors of the present invention studied (1) the influence of the corners A and B near which the injection port 21 and exhaust port 22 are disposed and (2) the influence of the distances d and d' on the tendency for air bubbles to mix into the particle-dispersed liquid 33 when injecting the particle-dispersed liquid 33 into the display medium 10 having the above construction.

The table in FIG. 3 shows the results of studying degrees of angles for the corners A and B near which the injection port 21 and exhaust port 22 are disposed, and the tendency for air bubbles to mix with the particle-dispersed liquid 33. In FIG. 3, the "◯" indicates that the ratio of samples to the total number of samples found to have air bubbles mixed in the particle-dispersed liquid 33 according to a visual check was no greater than 10%; the "Δ" indicates that the ratio of samples found to have residual air bubbles was greater than 10%, but no greater than 30%; and the "X" indicates that the ratio was 50% or greater.

As shown in FIG. 3, when the angle of the corner A is 30°, the evaluation is "◯" when the corner B has an angle of 30°, 60°, and 75°; "Δ" when the corner B has an angle of 90°, indicating an increase in the ratio of samples showing residual air bubbles; and "X" when the corner B has an angle of 120°, indicating that half or more of the samples showed residual air bubbles.

The results of evaluations for corners A having an angle of 60° and 75° are the same as those for the angle 30° described above, i.e. a "◯" for corners B having an angle of 30°, 60°, and 75°; a "Δ" for a corner B at an angle 90°; and a "X" for a corner B having an angle of 120°.

However, when the corner A has an angle of 90°, the evaluation is a "Δ" when the angle of the corner B is 75°, unlike when the angle of the corner A is 30°, 60°, and 75°. Further, when the angle of the corner A is 120°, the evaluation is "X", even when the angle of the corner B is 30°.

Based on the above results, it is possible to prevent air bubbles from mixing with the particle-dispersed liquid 33 when injecting the particle-dispersed liquid 33 by forming the corners A and B near where the injection port 21 and exhaust port 22 are disposed as acute angles, that is, angles greater than 0° and no greater than 90°.

It is also clear from the above results that setting the angles of the corners A and B greater than 0° and no greater than 75° is particularly effective for preventing air bubbles from mixing with the particle-dispersed liquid 33. Specifically, the flow of the particle-dispersed liquid 33 can be easily directed from the injection port 21 to the exhaust port 22, without producing residual air bubbles, when the angles of the corners A and B are set greater than 0° and no greater than 75°, thereby more effectively preventing air bubbles from mixing with the particle-dispersed liquid 33.

Figure 4:
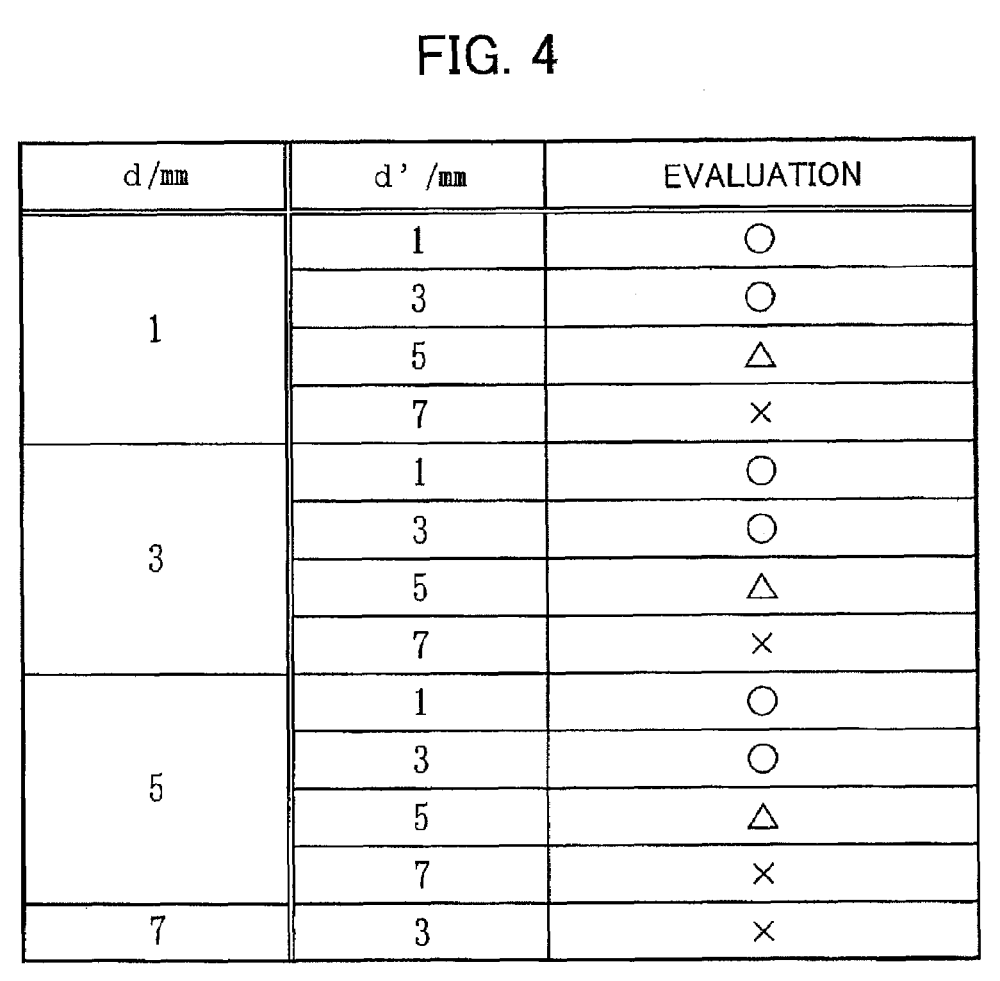

The table in FIG. 4 shows the results of studying the relationship between the distances d and d' and the tendency of air bubbles to mix into the particle-dispersed liquid 33. The evaluations "◯", "Δ", and "X" in the results shown in FIG. 4 have the same meanings as those in FIG. 3.

As shown in FIG. 4, when the shortest distance d between the injection port 21 and the vertex of the corner A was 1 mm, a "◯" evaluation was obtained for shortest distances d' between the exhaust port 22 and the vertex of the corner B of 1 mm and 3 mm; a "Δ" for a shortest distance d' of 5 mm; and a "X" for a shortest distance d' of 7 mm. The same results were obtained when the shortest distance d was set to 3 mm and 5 mm.

However, when setting the shortest distance d to 7 mm, a "X" evaluation was obtained even for a shortest distance d' of 3 mm, unlike the results when the shortest distance d was set to 1, 3, and 5 mm.

Based on these results, the flow of the particle-dispersed liquid 33 injected into the fluid chamber R can be easily controlled to flow along the two sides constituting the corner A, restricting air bubbles from remaining near the vertex of the corner A and, hence, effectively preventing air bubbles from mixing with the particle-dispersed liquid 33.

Further, air bubbles are less likely to remain near the vertex of the corner B when the particle-dispersed liquid 33 is injected if the shortest distance d' between the exhaust port 22 and the vertex of the corner B is no greater than 5 mm, and particularly no greater than 3 mm. Since the particle-dispersed liquid 33 can fill the fluid chamber R while reliably exhausting air bubbles, this construction can effectively prevent air bubbles from mixing with the particle-dispersed liquid 33.

Next, conditions for a preferable flow rate when injecting the particle-dispersed liquid 33 into the display medium 10 will be described with reference to FIGS. 5A and 5B. FIGS. 5A and 5B conceptually show the shape of an interface with respect to the direction of flow for the particle-dispersed liquid 33 injecting through the injection port 21.

FIG. 5A conceptually shows how the interface with respect to the direction of flow changes when the particle-dispersed liquid 33 is injected with pressure through the injection port 21 at a relatively high flow rate. When the particle-dispersed liquid 33 is injected through the injection port 21 at a relatively high rate, the interface moves in the direction S1a→S1b→S1c in a convex shape protruding in the direction of movement L. However, when the interface with respect to the direction of flow has a convex shape that protrudes in the direction of movement L, regions V and the like shown in FIG. 5A are produced in which air bubbles tend to remain between the particle-dispersed liquid 33 and the inner wall surface of the fluid chamber R. Hence, when the interface with respect to the direction of flow has a convex shape protruding in the direction of movement L, air bubbles are more likely to mix with the particle-dispersed liquid 33 as a result.

FIG. 5B conceptually illustrates how the interface with respect to the direction of flow changes when the particle-dispersed liquid 33 is injected at a relatively slow rate according to the ambient injection method described above, for example. When the particle-dispersed liquid 33 is injected through the injection port 21 at a relatively slow rate, the shape of the interface with respect to the direction of flow is concave relative to the direction of movement L since capillary action causes the particle-dispersed liquid 33 to advance more quickly along the surfaces of the inner walls. When the electrophoretic medium 30 serving as the dispersion medium of the particle-dispersed liquid 33 is a low-viscosity solvent in order to improve the response rate of the charged particles 31, the particle-dispersed liquid 33 advances particularly fast along the inner wall surfaces and, hence, the interface with respect to the direction of flow has a greater tendency to form a concave shape relative to the direction of movement L.

As shown in FIG. 5B, when the particle-dispersed liquid 33 is injected into the injection port 21 at a relatively slow rate, the interface moves in the progression S2a→S2b→S2c→S2d. When the flow interface forms a concave shape relative to the direction of movement L, the particle-dispersed liquid 33 fills the fluid chamber R without allowing air bubbles to remain therein, thereby effectively preventing air bubbles from mixing with the particle-dispersed liquid 33.

Therefore, injecting the particle-dispersed liquid 33 into the injection port 21 at a rate in which the interface with respect to the direction of flow forms a concave shape relative to the direction of flow is effective for preventing air bubbles from mixing with the particle-dispersed liquid 33.

Figure 6:
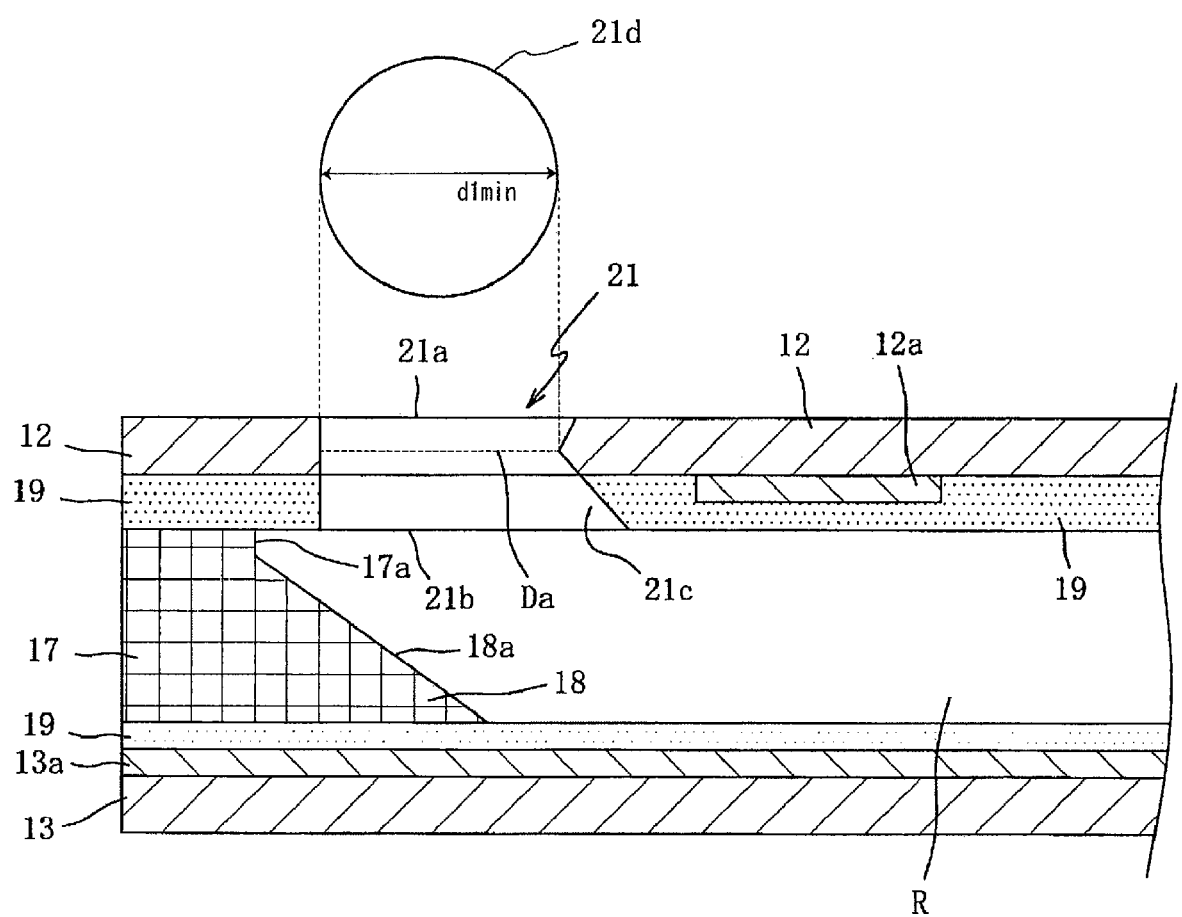
FIG. 6 is an explanatory diagram conceptually illustrating a cross section of the image display medium along the line VI-VI shown in FIG. 1A.

Next, a desired shape of the injection port 21 will be described with reference to FIGS. 6 through 9. FIG. 6 is a cross-sectional view taken along the line VI-VI shown in FIG. 1A conceptually illustrating a peripheral edge of the injection port 21. In order to simplify the drawing, the particle-dispersed liquid 33 has been omitted from the fluid chamber R in FIG. 6.

The injection port 21 is a hole penetrating the first substrate 12 from an opening endface 21a on the outer side of the display medium 10 to an opening endface 21b on the fluid chamber R side. In the view of FIG. 6, the injection port 21 has an opening endface 21d in a plan view. The width of the passage formed in the injection port 21 is not fixed.

The passage of the injection port 21 is preferably as large as possible so that the charged particles 31 do not clog the injection port 21 when introducing the particle-dispersed liquid 33. In the following description, the size of the passage in the injection port 21 is represented by a diameter d1 for each cross section in the injection port 21, the smallest of which is a minimum diameter d1min. Since the cross section of the injection port 21 is wider on the fluid chamber R side than the cross section indicated by Da in FIG. 6, the diameter d1 in the cross section Da is the shortest with respect to the diameter d1 for other cross sections in the injection port 21. Hence, the diameter d1 in the cross section Da is the minimum diameter d1min.

Next, a preferred size of the passage in the injection port 21 will be described in detail with reference to FIG. 7. In order to determine a preferred size for the passage in the injection port 21, the inventors of the present invention conducted an experiment to determine whether the charged particles 31 clogged the injection port 21 when the particle-dispersed liquid 33 was injected, while varying the size of the passage in the injection port 21. Specifically, the minimum diameter d1min of the injection port 21 was tested at 10, 20, 25, 30, 50, 100, 1000, and 5000 μm.

In this experiment, the injection ports had differing minimum diameters d1min, but resembled each other in shape, and a minimum diameter d2min for the exhaust port 22 (see FIG. 8) was set at 10 μm. Here, the minimum diameter d2 min is the smallest diameter among diameters d2 for all cross sections in the exhaust port 22. Further, the charged particles 31 serving as the dispersoid in the particle-dispersed liquid 33 were particles formed of a phthalocyanine pigment coated with a resin. The average size of the particles (i.e., the number median diameter was measured at about 5 μm using the Accu-Sizer manufactured by Particle Sizing Systems.

Further, the above experiment was conducted on particle-dispersed liquids 33 having charged particles 31 of differing densities C (0.1, 1, 5, 10, 20, and 50 wt %) in order to confirm how the concentration of the charged particles 31 in the particle-dispersed liquid 33 affect clogging in the injection port 21.

FIG. 7 shows the results of this experiment. In FIG. 7, a "○" indicates that the particle-dispersed liquid 33 was injected into the fluid chamber R without clogging the injection port 21; a "Δ" indicates that the particle-dispersed liquid 33 was injected into the fluid chamber R with some detention in the injection port 21; and a "X" indicates that the particle-dispersed liquid 33 could not be injected into the fluid chamber R because the charged particles 31 clogged the injection port 21.

As shown in FIG. 7, when the minimum diameter d1min of the injection port 21 was 10 μm, the charged particles 31 clogged the injection port 21, preventing the particle-dispersed liquid 33 from being injected uniformly into the fluid chamber R, even when the concentration C is at the lowest concentration of 0.1 wt %.

When the minimum diameter d1min was increased to 20 μm, the particle-dispersed liquid 33 could not be injected into the fluid chamber R at a relatively high concentration C of 20 wt % or greater, but could be injected into the fluid chamber R for a concentration C of 10 wt % or lower with some detention.

When the minimum diameter d1min was further increased to 25 μm, slight detention of the charged particles 31 occurred for a relatively high concentration C of 20 wt % or greater, but the particle-dispersed liquid 33 could be injected into the fluid chamber R for a concentration C in the entire range of 0.1-50 wt %.

When the minimum diameter d1min was further increased to 30 μm, the electrophoretic medium 30 could be injected into the fluid chamber R with no clogging of the charged particles 31 for a concentration C in the entire range of 0.1-50 wt %.

These results indicate that clogging of the charged particles 31 in the injection port 21 can be effectively prevented by setting the minimum diameter d1min for diameters d1 of all cross sections in the injection port 21 to about five times or greater the average particle size of the charged particles 31, and clogging of the charged particles 31 can be more effectively prevented by setting the minimum diameter d1min to about six times or greater the average size of the charged particles 31. Clearly, the minimum diameter d1min of the injection port 21 can be enlarged to a size sufficient for preventing the injection port 21 from influencing the display of images on the display medium 10.

Returning to FIG. 6, the injection port 21 is preferably shaped so that the diameter d1 in the opening endface 21b of the injection port 21 on the fluid chamber R side is longest, i.e. so that the opening endface 21b of the injection port 21 has the widest shape.

Generally, since the thickness of the fluid chamber R in the display medium 10 (the vertical dimension in FIG. 6) is only equivalent to the thickness of a few charged particles, the charged particles 31 are more likely to clog near the opening endface 21b on the fluid chamber R side when the opening endface 21b is configured of a plane substantially perpendicular to the thickness dimension of the fluid chamber R, so that the charged particles 31 are likely to clog the injection port 21 when injecting the particle-dispersed liquid 33. Hence, it is effective to form the injection port 21 so that the charged particles 31 are less likely to clog near the opening endface 21b as a measure of preventing the charged particles 31 from clogging the injection port 21 during injection.

It is possible to prevent the charged particles 31 from clogging the injection port 21 when injecting the particle-dispersed liquid 33 by forming the injection port 21 so that the opening endface 21b on the outlet end is widest, making the charged particles 31 less likely to clog near the opening endface 21b. The above effects for preventing clogging with the charged particles 31 can be obtained even when the cross section having the longest diameter d1 does not correspond with the opening endface 21b, provided that the cross section near the opening endface 21b is essentially same as the cross section of the opening endface 21b.

When the injection port 21 is provided in the first substrate 12, as shown in FIG. 6, the injection port 21 is preferably shaped with a tapered part 21c that widens the injection port 21 toward the opening endface 21b on the fluid chamber R side.

By forming the tapered part 21c in the injection port 21, the particle-dispersed liquid 33 flowing from the opening endface 21b into the fluid chamber R can be directed at a slope to the interface between the opening endface 21b and the fluid chamber R. Therefore, the particle-dispersed liquid 33 can be controlled to flow smoothly from the injection port 21 into the fluid chamber R, preventing the charged particles 31 from clogging the injection port 21 when injecting the particle-dispersed liquid 33.

The tapered part 21c may be started from a point in the middle of the injection port 21, as in the preferred embodiment, or may be formed along the entire injection port 21, i.e. between the opening endface 21a and opening endface 21b.

As shown in FIG. 6, a guide member 18 is provided along an edge of the hexagonal opening 17a formed in the rectangular gap spacer 17. The guide member 18 has a sloped surface 18a positioned below (the lower side in FIG. 6 and opposing the opening endface 21b of the injection port 21.

The guide member 18 functions to direct the flow of the particle-dispersed liquid 33 injected through the injection port 21 from the peripheral edge of the fluid chamber R toward the more spacious inner region. The guide member 18 can prevent the charged particles 31 from accumulating near the opening endface 21b, thereby preventing the charged particles 31 from clogging the injection port 21 when injecting the particle-dispersed liquid 33.

The guide member 18 need not be provided along the entire edge of the hexagonal opening 17a, but need only be provided in a region sufficient for receiving the particle-dispersed liquid 33 flowing through the opening endface 21b. Further, the guide member 18 may be integrally formed with the gap spacer 17, as shown in FIG. 6, or may be provided separately from the gap spacer 17.

Figure 8:
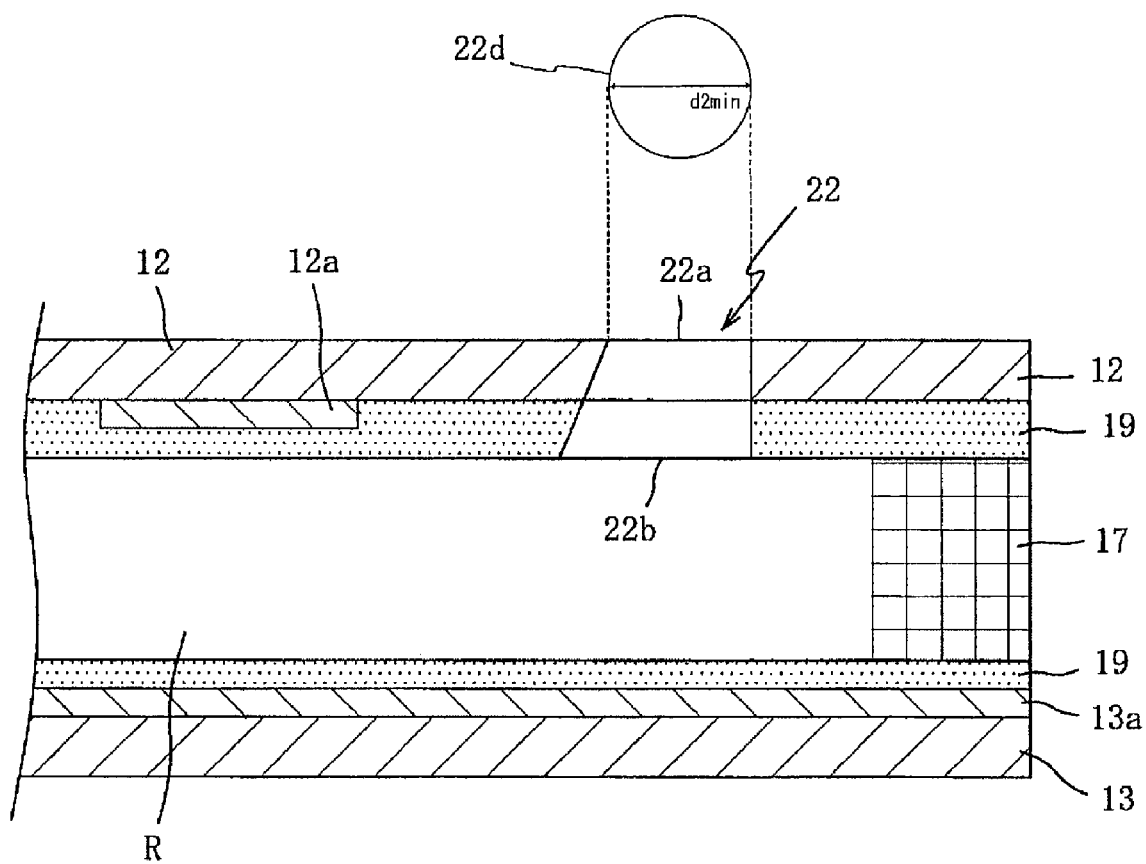
FIG. 8 is an explanatory diagram conceptually illustrating a cross section of the image display medium along the line VIII-VIII shown in FIG. 1A.

Next, a preferred shape of the exhaust port 22 will be described with reference to FIG. 8. FIG. 8 conceptually illustrates a cross section of the display medium 10 near the exhaust port 22 along the line VIII-VIII shown in FIG. 1A. To simplify the drawing, the particle-dispersed liquid 33 has been omitted from the fluid chamber R in FIG. 8.

Generally, if the passage in the exhaust port 22 is too narrow, the charged particles 31 will block the exhaust port 22 when the particle-dispersed liquid 33 is injected into the fluid chamber R, preventing the particle-dispersed liquid 33 from being satisfactorily injected into the fluid chamber R.

On the other hand, if the passage in the exhaust port 22 is too large, many of the charged particles 31 will flow out through the exhaust port 22 when injecting the particle-dispersed liquid 33 into the fluid chamber R, contaminating the portion of the exhaust port 22 bonded by the sealant. As a result, the sealant cannot perfectly seal the exhaust port 22, allowing air bubbles to enter the fluid chamber R after the exhaust port 22 is sealed, which air bubbles can degrade image quality.

Hence, the passage formed in the exhaust port 22 is preferably large enough to prevent blockage by the charged particles 31 when injecting the particle-dispersed liquid 33 and small enough to prevent the charged particles 31 from flowing out through the exhaust port 22.

In the following description, d2 represents the diameter in each cross section of the exhaust port 22, while d2 min represents the smallest diameter. In the preferred embodiment, the cross section of the exhaust port 22 grows smaller toward the outside, as shown in FIG. 8. In other words, the diameter d2 in an outer periphery 22d of an opening endface 22a formed on the side of the exhaust port 22 from which air is exhausted externally is the smallest diameter d2 for all cross sections in the exhaust port 22. Hence, the diameter d2 for the opening endface 22a is the minimum diameter d2min.

The preferred sized of the passage in the exhaust port 22 will be described in greater detail with reference to FIG. 9. As an experiment for determining the preferred size of the exhaust port 22, the inventors of the present invention confirmed visually whether the particle-dispersed liquid 33 was satisfactorily injected into the fluid chamber R and whether air bubbles in the fluid chamber R increased one week after sealing the exhaust port 22 for exhaust ports 22 having different passage widths, i.e. different minimum diameters d2 min (5, 10, 15, 20, and 25 μm)

In this experiment, the minimum diameter d2min of the exhaust port 22 was varied, but each exhaust port 22 was formed in a similar shape, and the minimum diameter d1min of the injection port 21 was set at 30 μm. Particles produced from a phthalocyanine pigment coated with resin were used as the charged particles 31, which are the dispersoid in the particle-dispersed liquid 33. The average size of the particles, i.e. the number median size, was measured using the Accu-Sizer manufactured by Particle Sizing Systems to be about 5 μm. Further, the concentration C of the charged particles 31 in the particle-dispersed liquid 33 was set at 10 wt %.

The table in FIG. 9 shows the results of the above experiment. As shown in FIG. 9, when the minimum diameter d2min was 5 μm, the charged particles 31 blocked the exhaust port 22, preventing the particle-dispersed liquid 33 from being injected satisfactorily into the fluid chamber R. However, when the minimum diameter d2min was set at 10 μm or greater, the particle-dispersed liquid 33 could be injected satisfactorily into the fluid chamber R.

These results indicate that the smallest minimum diameter d2min for the exhaust port 22 is preferably greater than about 1 times the average size of the charged particles 31. In other words, by setting the minimum diameter d2min greater than about 1 times the average size of the charged particles 31, it is possible to prevent the charged particles 31 from blocking the exhaust port 22 when injecting the particle-dispersed liquid 33. Consequently, the fluid chamber R can be filled with the particle-dispersed liquid 33 without injection of the particle-dispersed liquid 33 being hindered.

Further, as shown in FIG. 9, an increase in air bubbles in the fluid chamber R one week after sealing the exhaust port 22 was not detected for a exhaust port 22 having a minimum diameter d2min of 15 μm or less, but was detected when the minimum diameter d2min was 20 μm or greater.

These results indicate that the minimum diameter d2min of the exhaust port 22 is preferably less than about 4 times the average size of the charged particles 31. In other words, when the minimum diameter d2min was set less than about 4 times the average size of the charged particles 31, only a trace amount of charged particles 31 flowed through the exhaust port 22 when injecting the particle-dispersed liquid 33 into the fluid chamber R, but not enough to prevent a complete a seal in the exhaust port 22. As a result, the seal of the fluid chamber R could be maintained after the exhaust port 22 was sealed.

When considering the concentration of charged particles in a particle-dispersed liquid for use in the display medium of a common electrophoretic display device, the flow of the charged particles 31 through the exhaust port 22 can be effectively restrained by setting the size of the exhaust port 22, i.e. the minimum diameter d2min, no greater than about the diameter of the smallest circle that encompasses three circles having a diameter of an average particle size r $(((2\sqrt{3}+1)/3)r)$.

Returning to FIG. 8, the ideal shape of the exhaust port 22 is such that the smallest cross section, i.e. the cross section having d2=d2min, is the opening endface 22a on the side of the exhaust port 22 from which air is exhausted externally.

By forming the exhaust port 22 so that the opening endface 22a is the narrowest region (so that the diameter d2 of the opening endface 22a is smallest), the charged particles 31 are unlikely to impede the flow of the particle-dispersed liquid 33 toward the exhaust port 22. In other words, the particle-dispersed liquid 33 can easily fill the fluid chamber R up to the opening endface 22a.

If the particle-dispersed liquid 33 does not fill the fluid chamber R up to an opening endface 22b on the fluid chamber R side of the exhaust port 22, the unfilled area will produce air bubbles that mix with the particle-dispersed liquid 33. Accordingly, it is possible to prevent air bubbles from mixing with the particle-dispersed liquid 33 by filling the fluid chamber R with the particle-dispersed liquid 33 up to the opening endface 22b.

The effect of preventing air bubbles from mixing with the particle-dispersed liquid 33 can be achieved even when the cross section of the exhaust port 22 having the minimum diameter d2min does not correspond with the opening endface 22a, provided that the cross section near the opening endface 22a is essentially same as the cross section of the opening endface 22a.

The display medium 10 according to the present embodiment described above is configured so that the minimum diameter d1min in a cross section of the injection port 21 through which the particle-dispersed liquid 33 is injected into the fluid chamber R is at least 5 times the average size of the charged particles 31. Accordingly, this construction can prevent the charged particles 31 in the particle-dispersed liquid 33 from clogging the injection port 21 when the particle-dispersed liquid 33 is injected into the fluid chamber R.

The display medium 10 is also configured so that the exhaust port 22 through which air is exhausted externally when the particle-dispersed liquid 33 is injected through the injection port 21 into the fluid chamber R has a minimum diameter d2min that exceeds 1 times the average size of the charged particles 31. Accordingly, this construction prevents the charged particles 31 from blocking the exhaust port 22 when the particle-dispersed liquid 33 is injected into the fluid chamber R, allowing the particle-dispersed liquid 33 to fill the fluid chamber R without hindrance.

Further, by configuring the exhaust port 22 with a minimum diameter d2min less than 4 times the average size of the charged particles 31, it is possible to prevent the charged particles 31 from flowing out through the exhaust port 22 when injecting the particle-dispersed liquid 33 into the fluid chamber R, so that the exhaust port 22 can be sufficiently sealed with sealant. As a result, this configuration can prevent a decline in image quality occurring when air bubbles enter the fluid chamber R when the exhaust port 22 is sealed.

By configuring the exhaust port 22 with a minimum diameter d2min no greater than $[(2\sqrt{3}+3)/3]$ times the average size of the charged particles 31, it is possible to effectively suppress the charged particles 31 from flowing out of the exhaust port 22 when injecting the particle-dispersed liquid 33.

Further, by forming the exhaust port 22 such that the cross section having the minimum diameter d2min is on the side of the exhaust port 22 from which air is exhausted externally, the flow of the particle-dispersed liquid 33 toward the exhaust port 22 is unlikely to be impeded by charged particles clogging the exhaust port 22, thereby preventing air bubbles from entering the particle-dispersed liquid 33.

With the display medium 10 according to the present embodiment described above, the injection port 21 is formed near the corner A having an angle greater than 0° and no greater than 75° at a position in which the shortest distance d to the vertex of the corner A is no greater than 5 mm. Hence, when injecting the particle-dispersed liquid 33 into the fluid chamber R, the particle-dispersed liquid 33 can easily be controlled to flow in a direction along the two sides making up the corner A, thereby preventing air bubbles from remaining near the vertex of the corner A. As a result, the display medium 10 having this construction can effectively prevent air bubbles from mixing with the particle-dispersed liquid 33 when the particle-dispersed liquid 33 is injected into the fluid chamber R.

The exhaust port 22 is formed near the corner B, also having an angle greater than 0° and no greater than 75°, at a position in which the shortest distance d' from the vertex of the corner B is no greater than 5 mm. Accordingly, the particle-dispersed liquid 33 injected into the fluid chamber R is guided to the exhaust port 22 along the two sides constituting the corner B so that air bubbles are unlikely to remain near the vertex of the corner B and can be discharged reliably from the fluid chamber R as the fluid chamber R fills with the particle-dispersed liquid 33. As a result, the display medium 10 having this construction can effectively prevent air bubbles from entering the particle-dispersed liquid 33 when the particle-dispersed liquid 33 is injected into the fluid chamber R.

Providing one each of the injection port 21 and exhaust port 22 near the respective corners A and B having acute angles greater than 0° and no greater than 75°, as described above, minimizes the risk of air bubbles entering the fluid chamber R during and after sealing the injection port 21 and exhaust port 22, which problem is more likely to occur when a larger number of openings (injection ports or exhaust ports) are provided in the display medium 10. Therefore, this construction effectively prevents air bubbles from entering the particle-dispersed liquid 33 when the particle-dispersed liquid 33 is injected into the fluid chamber R.

By setting the corner A near which the injection port 21 is provided and the corner B near which the exhaust port 22 is provided in opposing corners separated farthest from each other, the flow of the particle-dispersed liquid 33 injected into the fluid chamber R can be most effectively directed from the injection port 21 to the exhaust port 22, thereby filling the fluid chamber R with the particle-dispersed liquid 33 while reliably exhausting air from the exhaust port 22. As a result, this construction effectively prevents air bubbles from entering the particle-dispersed liquid 33.

In the display medium 10 according to the present embodiment, the injection port 21 is formed such that the minimum diameter d1min for the cross section of the injection port 21 is at least 5 times the average size of the charged particles 31.

Hence, this construction can prevent the charged particles 31 in the particle-dispersed liquid 33 from clogging the injection port 21 when the particle-dispersed liquid 33 is injected into the fluid chamber R.

Further, since the exhaust port 22 is configured with a minimum diameter d2min of the cross section exceeding 1 times the average size of the charged particles 31, the fluid chamber R can be filled with the particle-dispersed liquid 33 without the charged particles 31 in the particle-dispersed liquid 33 blocking the exhaust port 22 and hindering the flow of the particle-dispersed liquid 33 in the fluid chamber R.

Further, since the minimum diameter d2min of the exhaust port 22 is set less than 4 times the average size of the charged particles 31, the charged particles 31 in the particle-dispersed liquid 33 can be restrained from flowing out through the exhaust port 22, enabling the exhaust port 22 to be sufficiently sealed. As a result, this construction can prevent a decline in image quality caused by air bubbles entering the fluid chamber R after the exhaust port 22 is sealed.

By setting the minimum diameter d2min of the exhaust port 22 no greater than $[(2\sqrt{3}+3)/3]$ times the average size of the charged particles 31, the charged particles 31 can more effectively be suppressed from flowing out through the exhaust port 22 when injecting the particle-dispersed liquid 33.

Since the cross section of the exhaust port 22 having the minimum diameter d2min is arranged on the side of the exhaust port 22 from which air is exhausted externally, the flow of the particle-dispersed liquid 33 toward the exhaust port 22 is unlikely to be hindered by charged particles clogging the exhaust port 22. As a result, this configuration can prevent air bubbles from entering the particle-dispersed liquid 33.

While the invention has been described in detail with reference to specific embodiments thereof, it would be apparent to those skilled in the art that many modifications and variations may be made therein without departing from the spirit of the invention, the scope of which is defined by the attached claims.

For example, while the injection port 21 and exhaust port 22 in the preferred embodiment described above have circular cross sections, this cross-sectional shape is not essential. When the injection port 21 and exhaust port 22 do not have a circular cross section, the smallest diameter of a circle inscribed in the cross section may be used as the minimum diameters d1min and d2min described in the preferred embodiment.

Further, the display medium 10 in the preferred embodiment is designed for an electrophoretic display device configured of the particle-dispersed liquid 33 sealed in the fluid chamber R. However, the present invention is not limited to this type of display medium and may be designed for a liquid crystal display device having a liquid crystal material sealed in a fluid chamber.

Figure 10A:
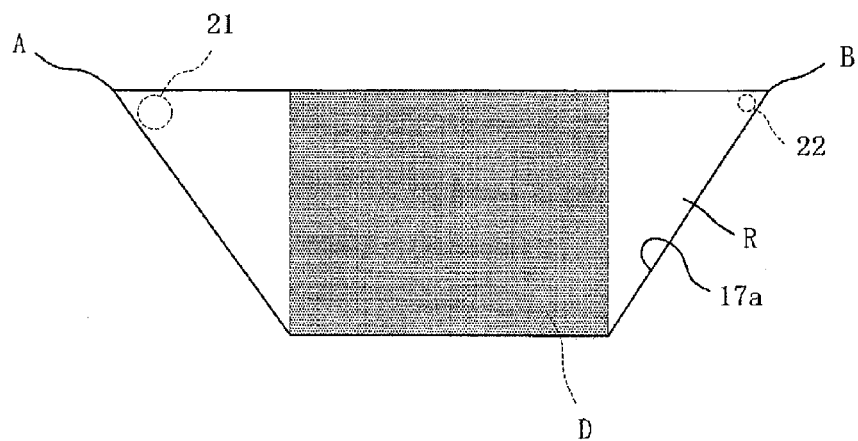
FIG. 10 shows variations of the shape of openings formed in a frame member.
Figure 10B:
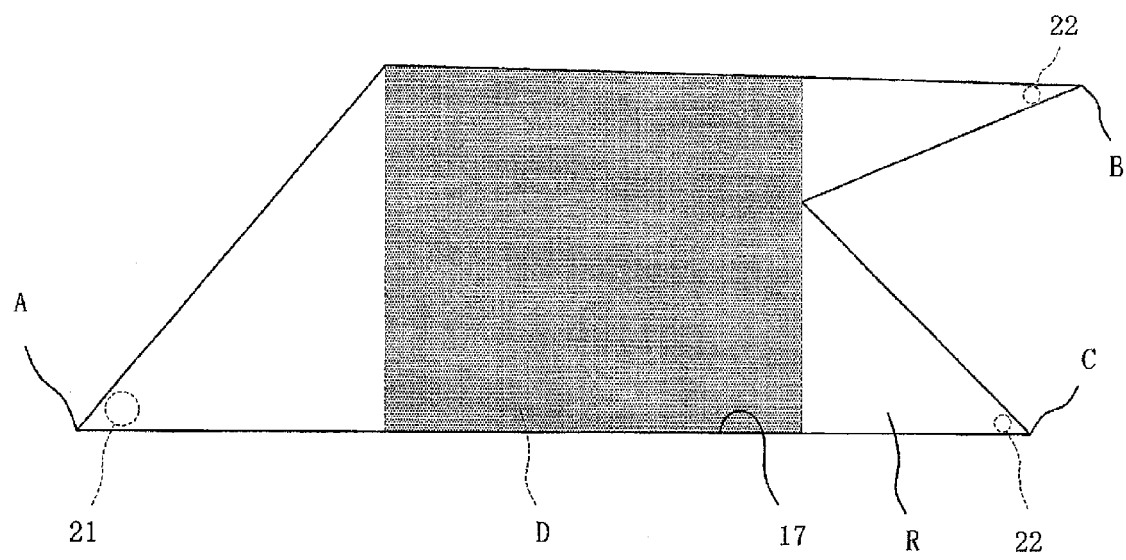

Further, the fluid chamber R according to the preferred embodiment described above has a hexagonal shape in a plan view with two opposing acute-angled corners A and B (see FIG. 1A), but the fluid chamber R according to the present invention is not limited to this hexagonal shape in a plan view. Next, variations in the shape of the fluid chamber R in a plan view will be described with reference to FIGS. 10A and 10B. FIGS. 10A and 10B show variations in the shape of the hexagonal opening 17a formed in the gap spacer 17, which corresponds to the shape of the fluid chamber R in a plan view.

As shown in FIGS. 10A and 10B, the shape of the fluid chamber R in a plan view may be modified to various shapes and is not limited to a hexagonal shape. Specifically, there is no particular limitation to the shape of the fluid chamber R, provided that the fluid chamber R in a plan view is shaped as a polygon with at least two acute angles, and at least one each of the injection port 21 and exhaust port 22 are provided near the vertices of these corners.

Further, while it is preferable that the acute-angled corners A and B are not neighboring angles, as described in the preferred embodiment, this construction can effectively prevent air bubbles from entering the particle-dispersed liquid 33 sealed in the fluid chamber R, as described above, even when the corners A and B are neighboring corners, as shown in FIG. 10A, provided that the angles of the corners A and B are acute and, particularly, greater than 0° and no greater than 75°.

As shown in FIG. 10B, the fluid chamber R may be formed with three acute-angled corners (corners A, B, and C), or certainly more than three acute-angled corners. When the fluid chamber R has the three acute-angled corners A, B, and C in a plan view, the injection port 21 and exhaust ports 22 may be provided near each of the three corners A, B, and C, as shown in FIG. 10B, or may be provided near only some of the corners, provided that at least one each of the injection port 21 and exhaust port 22 is provided near a total of at least two acute-angled corners.

When a total of three or more injection ports 21 and exhaust ports 22 are provided, the injection ports 21 and exhaust ports 22 are preferably arranged so that the distances between injection ports 21 and exhaust ports 22 is greater than the distance between one of the injection ports 21 and the other injection ports 21 and/or the distance between one of the exhaust ports 22 and the other exhaust ports 22.

In other words, as in the example of FIG. 10B, the injection ports 21 and exhaust ports 22 are preferably arranged to separate the injection ports 21 from the exhaust ports 22 as much as possible. With this configuration, the flow of the particle-dispersed liquid 33 injected into the fluid chamber R can be effectively directed from the injection ports 21 to the exhaust ports 22 while reducing the likelihood of residual air bubbles. As a result, air bubbles are reliably exhausted through the exhaust port 22 when the fluid chamber R is filled with the particle-dispersed liquid 33, thereby effectively preventing the air bubbles from entering the particle-dispersed liquid 33 sealed in the fluid chamber R.

In the preferred embodiment described above, the peripheral edges of the fluid chamber R in a plan view are formed in a polygonal (hexagonal) shape having acute-angled corners A and B configured of two adjacent edges. However, at least the corners A and B may be configured of a shape corresponding to acute-angled corners rather than being configured of acute-angled corners constituting two adjacent edges.

Figure 11A:
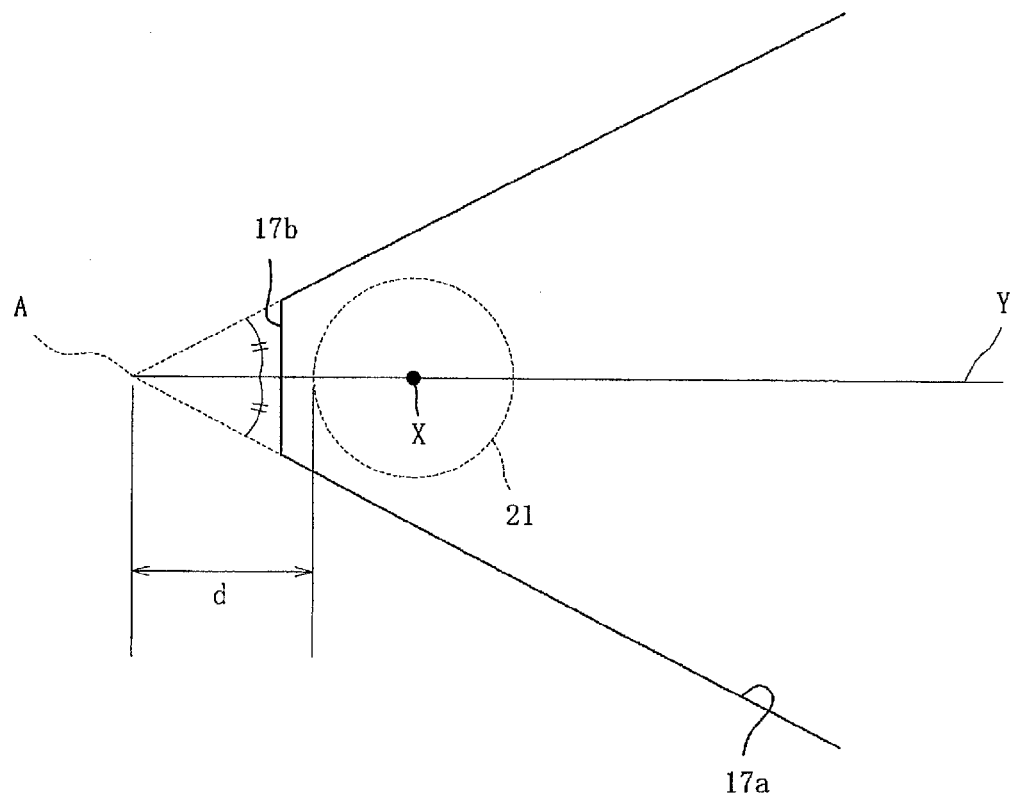
FIG. 11 shows variations of the shape of peripheral edges corresponding to the corner A.
Figure 11B:
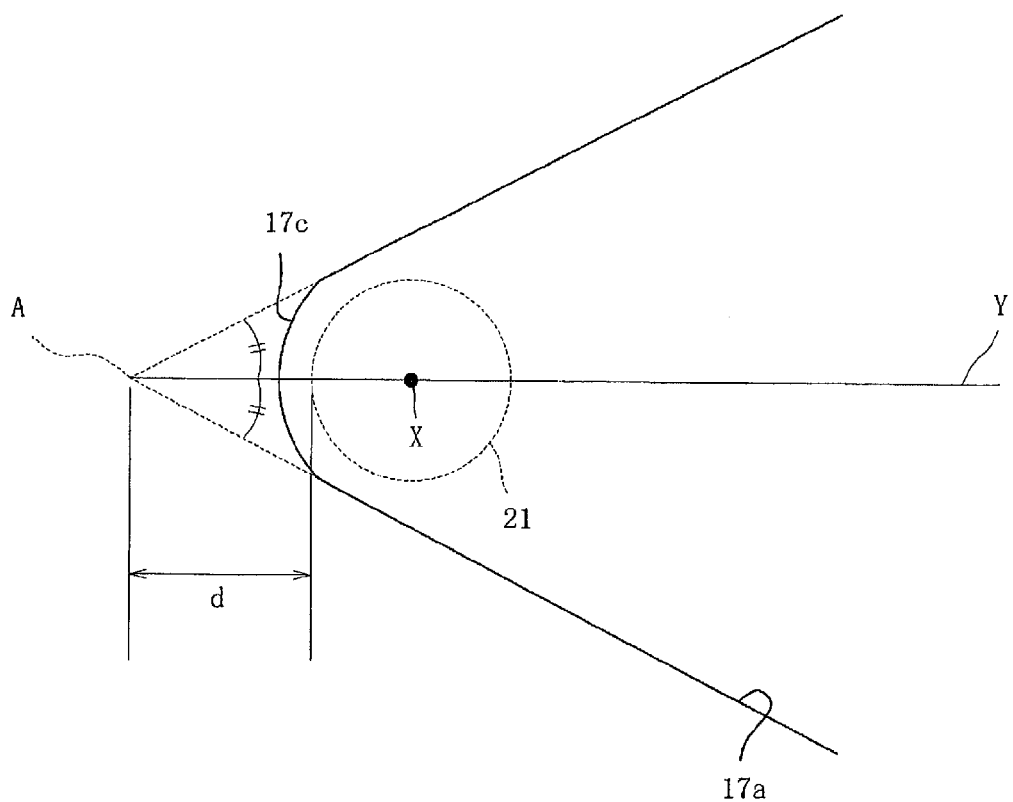

Next, shapes of the fluid chamber R corresponding to a polygon in a plan view will be described with reference to FIGS. 11A and 11B. FIGS. 11A and 11B show variations of the shapes formed by peripheral edges of the fluid chamber R corresponding to an acute-angled corner A. The peripheral edges of the fluid chamber R in a plan view may be formed by cutting the corner A near the vertex, as shown in FIG. 11A, or by rounding the corner A near the vertex, as shown in FIG. 11B, for example. In such cases, the injection port 21 (exhaust port 22) is disposed along bisectors of the virtual corner A indicated by dotted lines in FIGS. 11A and 11B. By positioning the injection port 21 in these configurations so that the shortest distance d to the vertex of the virtual corner A is no greater than 5 mm, air bubbles can be effectively prevented from entering the particle-dispersed liquid 33 sealed in the fluid chamber R, just as with the hexagonal fluid chamber R with the acute-angled corner A described in the preferred embodiment (see FIG. 1A).

When shaping the fluid chamber R by cutting the corner A near the vertex thereof, the corner A may be cut in a single straight line, as shown in FIG. 11A, or may be cut in a plurality of straight lines to form a chevron-shaped protrusion on the corner A side. Further, while FIG. 11 shows only variations of the corner A near which the injection port 21 is provided, the same shapes may be applied to the corner B near which the exhaust port 22 is provided.

In the preferred embodiment described above, both the injection port 21 and exhaust port 22 are positioned outside the rectangular-shaped display region D (see FIG. 1A). However, the shape of the display region D may be modified as desired, and the injection port 21 and exhaust port 22 may be positioned inside the display region D.

In the preferred embodiment described above, both the injection port 21 and exhaust port 22 are formed in the first substrate 12, but the injection port 21 and exhaust port 22 may be formed in the second substrate 13 instead. Further, at least one of the injection port 21 or exhaust port 22 may be provided on a side surface of the fluid chamber R. In such cases, the injection port 21 and exhaust port 22 should be positioned so that the shortest distances d or d' to the vertex of the acute-angled corner A or B is no greater than 5 mm.

Figure 12:
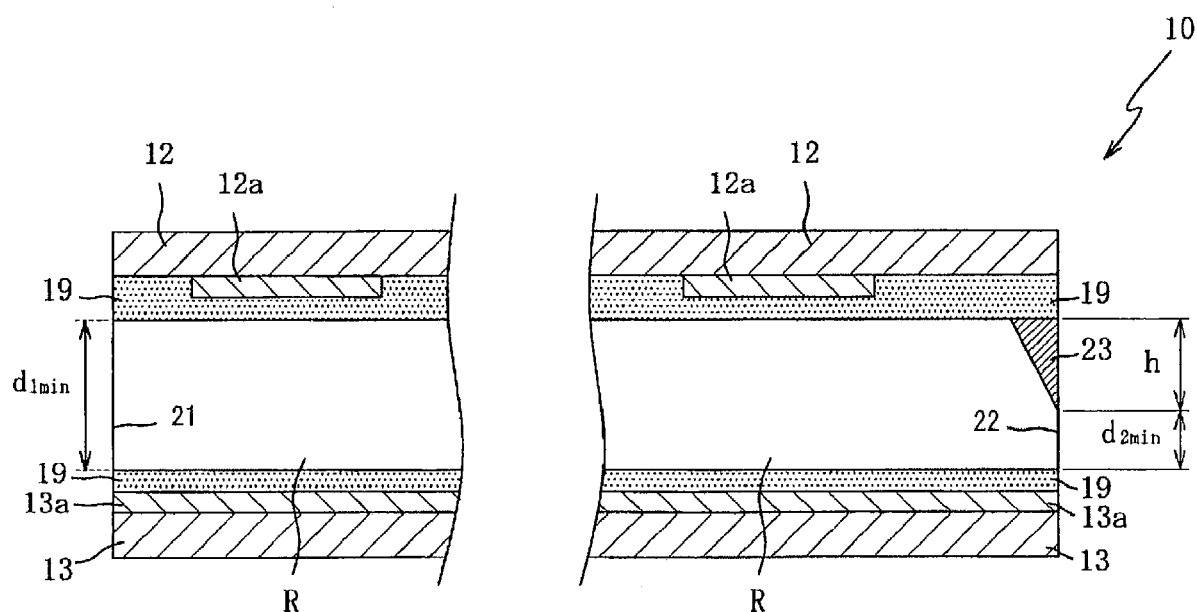
FIG. 12 shows a cross-sectional view of the injection port and exhaust port according to a variation of the embodiment.

If the exhaust port 22 (injection port 21) is provided on a side surface of the fluid chamber R, the diameter of the exhaust port 22 may be adjusted by providing a triangular prism-shaped protruding part 23 along the exhaust port 22 side edge of the first substrate 12, for example, as shown in FIG. 12.

One method for providing this type of protruding part 23 in the display medium 10 is as follows. First, the protruding part 23 is provided on the first substrate 12 by curing a heat-curable resin at a prescribed position thereon. Next, an epoxy resin film is provided between the first substrate 12 and second substrate 13 as a spacer 17 having two adhesive layer for adhesive the spacer 17 with the first substrate 12 and second substrate 13, while film of a thickness corresponding to the thickness of the fluid chamber R is interposed therebetween. Subsequently, the film is removed through the exhaust port 22.

Alternatively, after molding the protruding part 23 of resin into a triangular prism shape and fixing the protruding part 23 to the first substrate 12 with adhesive, the spacer 17 may be provided while adjusting the separation between the first substrate 12 and second substrate 13 with braces.

The shapes of the injection port 21 and exhaust port 22 described in the preferred embodiment and the variations thereof are merely examples, and the present invention is not limited to these shapes. Next, variations of the injection port 21 and exhaust port 22 will be described with reference to FIGS. 13A-13C. In order to simplify the drawings, the first substrate 12, X electrodes 12a, and protective film 19 and the second substrate 13, Y electrodes 13a, and protective film 19 are each displayed as integral units in FIGS. 13A-13C.

Figure 13A:
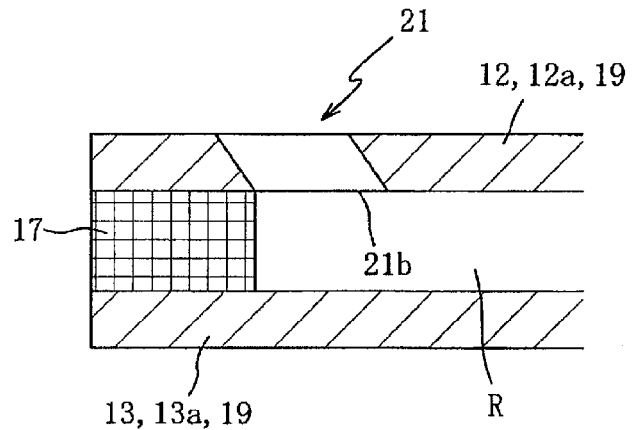
FIG. 13 shows variations of the shape of the injection port.

In the preferred embodiment described above, the tapered part 21c is provided on the injection port 21 for directing the flow of the particle-dispersed liquid 33 entering the fluid chamber R through the opening endface 21b in a direction sloped relative to the interface between the opening endface 21b and the fluid chamber R. However, instead of providing the tapered part 21c as described in the preferred embodiment, the inner wall surfaces of the injection port 21 may be formed at a slant to the opening endface 21b, that is, the interface between the opening endface 21b and the fluid chamber R, as shown in FIG. 13A, for directing the flow of the particle-dispersed liquid 33 at a slope relative to the interface between the opening endface 21b and the fluid chamber R.

Figure 13B:
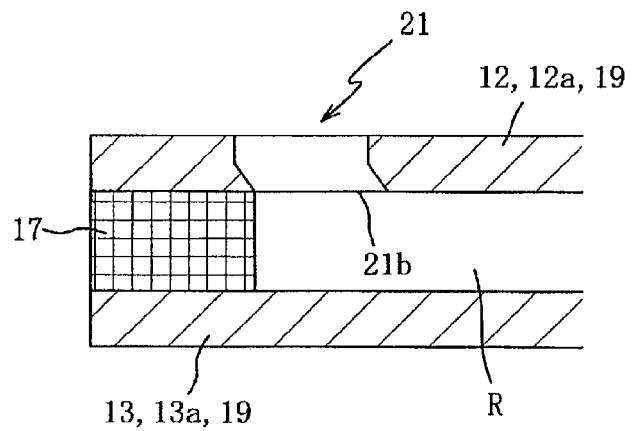

Here, the inner wall surfaces of the injection port 21 should be sloped relative to the opening endface 21b at least in the region near the opening endface 21b, as shown in FIG. 13B.

Figure 13C:
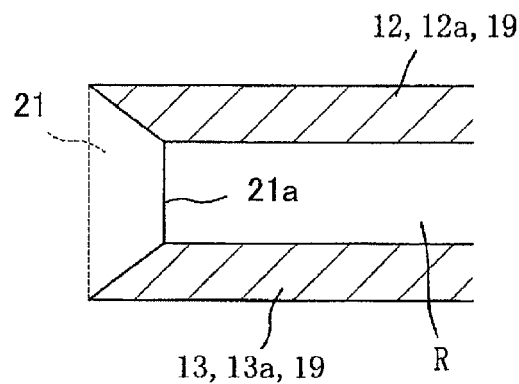

Further, if the injection port 21 is provided on a side surface of the fluid chamber R, as shown in FIG. 13C, the injection port 21 is preferably formed so that the diameter d1 in the opening endface 21a on the fluid chamber R side of the injection port 21 or a cross section near the opening endface 21a is the minimum diameter d1min. By forming the injection port 21 in this way, the flow of the particle-dispersed liquid 33 injected through the opening endface 21a into the fluid chamber R can be concentrated in the center of the fluid chamber R with respect to the thickness dimension to ensure a smooth flow.

The exhaust port 22 may be configured in a cylindrical shape having a passage of a prescribed diameter, as in the injection port 21 shown in FIG. 13C. In this case, as described in the preferred embodiment, the diameter d2 of the exhaust port 22 in the opening endface on the side of the exhaust port 22 from which air is exhausted externally is ideally set as the minimum diameter d2min.

Further, in the preferred embodiment described above, the preferred range for the minimum diameter d2min found in calculations was [about 1 times the average size of the charged particles 31]$<$d2min$\leq$[about $(2\sqrt{3}+3)/3$ times the average size of the charged particles 31]. However, the range of preferable minimum diameter d2min may be found through calculations using values corresponding to the particle size distribution of the charged particles rather than the average particle size.

For example, if the particle size distribution of the charged particles 31 is within a small range such that the $(2\sqrt{3}+3)/3$Xmin>Xmax, where Xmin is the smallest diameter among the charged particles 31 and Xmax the largest diameter, then the range of minimum diameter d2min is preferably found from [about 1 times Xmax]$<$d2min$\leq$[about $(2\sqrt{3}+3)/3$ times Xmin].

However, if the particle size distribution of the charged particles 31 spans a wide range such that the $(2\sqrt{3}+3)/3$Xmin$\leq$Xmax and the number mode size Xmode is smaller than the average particle size, i.e., when there are a lot of small particles, the outflow of the small particles should be considered. Hence, the range of d2min is preferably [about 1 times Xa]$<$d2min$\leq$[about $(2\sqrt{3}+3)/3$ times Xa], where Xa=(Xmode−Xmin)×2. Note that the number mode size Xmode indicates the particle size when number frequency of particle sizes is a maximum.

Further, if the particle size distribution of the charged particles 31 spans a wide range such that the $(2\sqrt{3}+3)/3$Xmin$\leq$Xmax and the average particle size is no greater than the number mode size Xmode, i.e., when there are a lot of large particles, consideration should be given to the ease in which large particles may clog the injection port 21 or the exhaust port 22. Hence, the range of d2min is preferably set to [about 1 times Xmax]$<$d2min$\leq$[about $(2\sqrt{3}+3)/3$ times Xmax].

In the preferred embodiment described above, both the injection port 21 and exhaust port 22 are provided in the first substrate 12, which is the substrate on the display surface side. However, the injection port 21 and exhaust port 22 may be provided in the second substrate 13 instead. Further, the injection port 21 or the exhaust port 22 may be provided in the first substrate 12 or the second substrate 13, while remaining of the injection port 21 and the exhaust port 22 may be disposed such that the opening endface on the fluid chamber R side is formed in the side surface of the fluid chamber R.

In the preferred embodiment, the injection port 21 and exhaust port 22 are configured of through holes provided in the first substrate 12 and make use of the gap between the first substrate 12 and second substrate 13, but the injection port 21 and exhaust port 22 may be configured of a mesh or other separate member. In this case, the minimum diameters d1min and d2min for cross sections in the mesh openings must fall within the suitable range described above.

Further, while the X electrodes 12a and Y electrodes 13a are provided on opposing side surfaces of the first substrate 12 and second substrate 13 in the preferred embodiments, the X electrodes 12a and Y electrodes 13a may be eliminated from the display medium 10. In this case, the display medium is mounted on a display device having a main body. Pairs of electrodes equivalent to the X electrodes 12a and Y electrodes 13a are provided on the main body. Images are displayed on the display device by interposing the display medium 10 without the X electrodes 12a and Y electrodes 13a between the pairs of electrodes provided on the main body.

What is claimed is:

1. A display medium comprising:
a pair of substrates facing to be in parallel with each other, at least one of the pair of substrates constituting a display surface;
a spacer disposed between the pair of substrates to form a fluid chamber together with the pair of substrates, the fluid chamber encapsulating a fluid material and having a polygonal shape in a cross section taken parallel to the display surface, the polygonal shape having two acute corners each having an angle greater than 0° and no greater than 75°, wherein the fluid material flows in accordance with electric fields generated between the pair of substrates to display images on the display surface;
an injection port through which the fluid material is injected into the fluid chamber; and
an exhaust port through which air in the fluid chamber is exhausted outside the fluid chamber,
wherein a distance between one of the injection port and the exhaust port and one of the two acute corners as viewed from a direction orthogonal to the substrate is equal to or smaller than 5 mm.

2. The display medium according to claim 1, wherein at least one of the injection port and the exhaust port is disposed on a bisector of the acute corner as viewed from the direction.

3. The display medium according to claim 1, wherein the polygonal shape has a diagonal line connecting the two acute corners.

4. The display medium according to claim 1, wherein the polygonal shape has at least first to fourth corners, the first corner and the second corner corresponding to the two acute corners, a distance between the first corner and the second corner as viewed from the direction being greater than a distance between the third corner and the fourth corner as viewed from the direction.

5. The display medium according to claim 1, wherein the polygonal shape has a plurality of corners, a distance between the two acute corners as viewed from the direction being the greatest among distances between any two corners viewed from the predetermined direction.

6. The display medium according to claim 1, wherein a distance between the exhaust port and one of the two acute corners as viewed from the direction is equal to or smaller than 3 mm.

7. The display medium according to claim 1, wherein the injection port is formed through the substrate and has a plurality of first cross sections taken parallel to the substrate, each circle inscribed in each first cross section having each diameter d1,
wherein the fluid material includes charged particles having an average size, a smallest diameter d1min among the diameters d1 being equal to or greater than 5 times the average size.

8. The display medium according to claim 7, wherein the plurality of first cross sections includes a first end cross section facing the fluid chamber, a circle inscribed in the first end cross section having the largest diameter d1max among the diameters d1.

9. The display medium according to claim 7, wherein the injection port has a portion in which the diameter d1 increases as the first cross section approaches the fluid chamber.

10. The display medium according to claim 1, wherein the exhaust port is formed through the substrate and has a plurality of second cross sections taken parallel to the substrate, each circle inscribed in each second cross section having each diameter d2,
wherein the fluid material includes charged particles having an average size, a smallest diameter d2min among the diameters d2 being greater than the average size and smaller than 4 times the average size.

11. The display medium according to claim 10, wherein the smallest diameter d2min is greater than the average size and equal to or smaller than $[(2\sqrt{3}+3)/3]$ times the average size.

12. The display medium according to claim 10, wherein the plurality of second cross sections includes a second end cross section facing an outside, a circle inscribed in the second end cross section having the smallest diameter d2min among the diameters d2.

13. The display medium according to claim 12, wherein the injection port has a third cross section taken in a direction orthogonal to the substrate along a straight liner connecting the injection port and the exhaust port, the third cross section having a first end face facing the exhaust port, the first end face approaching the exhaust port as approaching the fluid chamber.

14. The display medium according to claim 12, further comprising a dispersion liquid guide member provided on the substrate opposing the substrate through which the injection port is formed, the dispersion liquid member having a fourth cross section taken in a direction orthogonal to the substrate along a straight line connecting the injection port and the exhaust port, the fourth cross section having a second end face apart from the injection port as approaching the exhaust port.

15. The display medium according to claim 1, wherein the fluid material is injected into the fluid chamber according to an ambient pressure injection method.

16. The display medium according to claim 1, wherein the injection port is formed through the spacer.

17. The display medium according to claim 1, wherein the exhaust port is formed through the spacer.

* * * * *